L. STURGES.
STORAGE RECEPTACLE FOR MILK OR OTHER LIQUIDS.
APPLICATION FILED JAN. 22, 1906.

998,652.

Patented July 25, 1911.

Witnesses:
Ray White
Harry R. L. White

Inventor:
Lee Sturges.
By Charles W. Lies, Atty.

UNITED STATES PATENT OFFICE.

LEE STURGES, OF CHICAGO, ILLINOIS.

STORAGE-RECEPTACLE FOR MILK OR OTHER LIQUIDS.

998,652. Specification of Letters Patent. Patented July 25, 1911.

Application filed January 22, 1906. Serial No. 297,180.

*To all whom it may concern:*

Be it known that I, LEE STURGES, a citizen of the United States, and a resident of Chicago, in the county of Cook and State of Illinois, have invented certain new and useful Improvements in Storage-Receptacles for Milk or other Liquids; and I do hereby declare that the following is a full, clear, and exact description of the same, reference being had to the accompanying drawings, and to the letters of reference marked thereon, which form a part of this specification.

This invention relates to storage receptacles or cans for milk or other liquids and more particularly to a storage can having an open top and into which the liquid to be contained is poured. Heretofore with devices of the kind considerable loss has been occasioned by the liquid when poured therein splashing out of the receptacle owing to the shape of the vessel.

The object of this invention is to afford an open top vessel of such shape that a liquid when poured therein will not splash therefrom and also to afford a receptacle having an inclined bottom and provided with a faucet or other means whereby all the contents can be drawn therefrom.

It is a further object of the invention to afford a containing vessel so constructed that the contents may be drawn therefrom without disturbing the surface thereof, and in which the construction is such as to enable the device to be perfectly cleaned and at all times kept in a sanitary condition.

The invention consists in the matters hereinafter described and more fully pointed out and defined in the appended claims.

Figure 1:
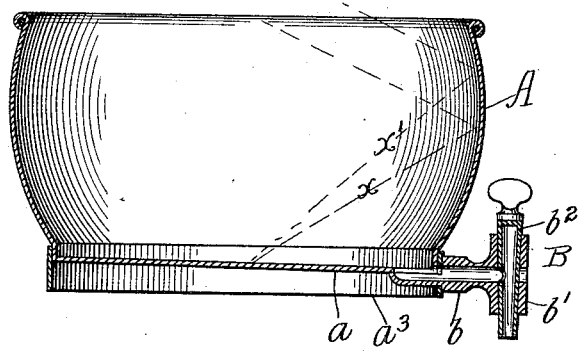
Figure 2:
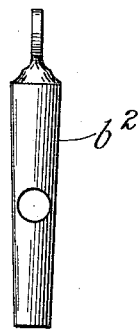

In the drawings: Figure 1 is a central vertical section of a device embodying my invention. Fig. 2 is an enlarged side elevation of the plug for the faucet.

As shown in the drawings: A indicates the containing can or vessel which as shown is usually of pressed metal preferably coated with tin or other suitable coating material not affected by the liquid to be contained therein. Said vessel comprises, as shown, a plain or flat circular bottom from which the integral side walls arise for a short distance vertically as shown in Fig. 1 and of unequal height on opposite sides of the vessel. As shown from the vertically extending wall portion, the walls of said vessel curve spherically upward and outward and at the top inwardly affording an inwardly spherically concave side wall which as the fluid is poured into the vessel acts to deflect any outwardly spraying liquid back approximately to common center so that the same falls into the vessel. As shown the straight portions of said side walls are fitted into and soldered, brazed or otherwise secured within a band of metal $a^3$ of uniform width. In consequence the bottom $a$ of said vessel inclines toward that side of the vessel at which the straight portion of the side wall is highest. At said point and opening through said band $a^3$ and the bottom of said receptacle is a faucet $b$ comprising a tubular shank or receiving end adapted to be soldered or otherwise secured in register with the aperture in the bottom of said vessel and which at its outer end is provided transversely with a vertically apertured head through which also extends an aperture in alinement with the bore of the shank $b$. A conical tubular plug $b^2$ fits in the bore in the head of the faucet and is provided with an aperture in one side thereof in position to register with the bore in the shank $b$ and which when rotated to bring said aperture in register with said passage permits the fluid to flow therefrom as is usual and when rotated in the opposite direction closes the faucet. Said faucet being constructed wholly of metal and provided with alined apertures permits of thorough cleansing to render the same at all times sanitary.

The operation is as follows: Obviously the vessel being constructed with spherically concave sides which arise upwardly with very slight flare the liquid poured into said vessel if splashed upwardly contacts the wall of said vessel as for instance in the line $x$ and in consequence the angle of reflection being equal to the angle of incidence is deflected back into the path of the liquid flowing into the vessel and is again carried down to the bottom. Or should the splashing liquid move in the line $x'$ the same result is attained inasmuch as the liquid is deflected back at or near the top of the vessel to the center of the same and into the path of the descending fluid and thus prevented from escaping from the container.

Obviously the supply vessel may be made of different material depending upon the use to which the same is to be applied and also the same may be made of any size, capacity or height and the sides may have any degree of curvature to attain the object sought and furthermore the vessel may be supported otherwise than by the continuous band before described to hold the bottom thereof at an inclination to enable the fluid to be drained therefrom. I therefore do not purpose limiting this application for patent otherwise than necessitated by the prior art as obviously details of construction may be varied without departing from the principles of my invention.

I claim as my invention:

1. A receptacle of the class described having a flat, inclined bottom, side walls extending vertically for a short distance above said bottom and then concaved on the inner side, said bottom provided with a depression at its lowest point which is ported through the side wall at its lowest point, a supporting band fitted around the bottom of said vessel and extending below the same and a faucet extending therethrough and communicating with the outlet aperture in said bottom.

2. A receptacle comprising vertical walls having their upper edges horizontal and the lower edges inclined, a flat bottom rigidly connected to the inclined edges, concaved walls rigidly secured to the horizontal edges of the vertical walls, a band or rim supporting the receptacle and a spigot or faucet opening through the rim at the lowest point of the vertical wall adapted to drain the receptacle.

In testimony whereof I have hereunto subscribed my name in the presence of two subscribing witnesses.

LEE STURGES.

Witnesses:
C. W. HILLS,
W. W. WITHENBURY.

---

Copies of this patent may be obtained for five cents each, by addressing the "Commissioner of Patents, Washington, D. C."